US009862333B1

(12) United States Patent
Jones

(10) Patent No.: US 9,862,333 B1
(45) Date of Patent: Jan. 9, 2018

(54) STORAGE SYSTEM FOR VEHICLE

(71) Applicant: James B Jones, Joplin, MO (US)

(72) Inventor: James B Jones, Joplin, MO (US)

(*) Notice: Subject to any disclaimer, the term of this patent is extended or adjusted under 35 U.S.C. 154(b) by 0 days.

(21) Appl. No.: 15/083,703

(22) Filed: Mar. 29, 2016

Related U.S. Application Data

(60) Provisional application No. 62/143,269, filed on Apr. 6, 2015.

(51) Int. Cl.
*B60R 11/06* (2006.01)
*B60R 9/06* (2006.01)
*B60R 11/00* (2006.01)

(52) U.S. Cl.
CPC .............. *B60R 11/06* (2013.01); *B60R 9/065* (2013.01); *B60R 2011/004* (2013.01); *B60R 2011/0084* (2013.01); *B60R 2011/0092* (2013.01)

(58) Field of Classification Search
CPC . B60R 11/06; B60R 9/065; B60R 2011/0092; B60R 2011/0084; B60R 2011/004
USPC ....................................................... 296/37.6
See application file for complete search history.

(56) References Cited

U.S. PATENT DOCUMENTS

| | | | |
|---|---|---|---|
| 4,488,669 A | 12/1984 | Waters | |
| 4,522,326 A | 6/1985 | Tuohy | |
| 4,531,774 A | 7/1985 | Whatley | |
| 4,635,992 A | 1/1987 | Hamilton | |
| 4,889,377 A | 12/1989 | Hughes | |
| 4,936,624 A | 6/1990 | West | |
| 4,967,944 A | 11/1990 | Waters | |
| 5,088,636 A | 2/1992 | Barajas | |
| 5,121,959 A | 6/1992 | King | |
| 5,303,969 A | 4/1994 | Simnacher | |
| 5,890,866 A | 4/1999 | Scheibel | |
| 6,283,526 B1 * | 9/2001 | Keough | B60P 1/003 296/183.1 |
| 6,464,277 B2 | 10/2002 | Wilding | |
| 6,607,230 B2 | 8/2003 | Voves | |
| 6,789,829 B1 * | 9/2004 | Kapels | B62D 33/02 296/11 |
| 7,182,177 B1 * | 2/2007 | Simnacher | B66F 3/12 187/211 |

* cited by examiner

*Primary Examiner* — Joseph D Pape
*Assistant Examiner* — Dana Ivey
(74) *Attorney, Agent, or Firm* — Wright Lindsey Jennings, LLP; Meredith Lowry

(57) ABSTRACT

The present invention provides a storage system for a vehicle, namely a truck, that adjusts the height of the storage compartment to provide an access through the sidewalls of the storage compartment to the interior of the compartment.

4 Claims, 4 Drawing Sheets

STORAGE SYSTEM FOR VEHICLE

CROSS-REFERENCE TO RELATED APPLICATIONS

This application claims priority to and is a continuation-in-part of U.S. Provisional Patent Application Ser. No. 62/143,269 filed on Apr. 6, 2015, the disclosure of which is hereby incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

The present invention relates generally to a storage device, and more particularly, a storage system that can be hydraulically lifted from the bed of a truck or similar vehicle to provide improved access to the interior of the compartment.

The cargo carrying area of a pickup truck, van, sport utility or similar vehicle is often referred to as the "bed". During certain types of transport it is desirable to include a storage container in a vehicle's bed to retain, for example, tools, equipment, supplies, groceries or other items to which ready and convenient access is necessary or desirable. A bed mounted toolbox represents one such storage container.

Many of the prior art bed-mounted storage containers are inconveniently positioned. For example, the positioning of some storage containers requires the user to lean over the sides of a truck bed to obtain a complete view of the contents. This design also makes it more difficult for items to be removed from the storage containers. Various configurations of prior-art storage containers are described herein.

U.S. Pat. No. 4,488,669 (1984) to Waters, U.S. Pat. No. 4,531,774 (1985) to Whatley and U.S. Pat. No. 4,967,944 (1990) to Waters, each disclose varying configurations of side-mounted toolboxes. Another configuration of a side-mounted toolbox enables the toolbox to slide along rails which are affixed to the top or insides of the vehicle's side panels; however, they too are difficult to access due to their height and the need to reach over the vehicle's tailgate or vehicle side panels. Similar side-mounted configurations are disclosed in, for example, U.S. Pat. No. 4,522,326 (1985) to Tuohy III, U.S. Pat. No. 4,635,992 (1987) to Hamilton et al, U.S. Pat. No. 4,889,377 (1989) to Hughes, U.S. Pat. No. 5,088,636 (1992) to Barajas, U.S. Pat. No. 5,121,959 (1992) to King, U.S. Pat. No. 6,464,277 (2002) to Wilding, U.S. Pat. No. 6,460,174 (2002) to Lance and U.S. Pat. No. 6,607,230 (20003) to Voves. These devices also have the disadvantage of extending beyond the vehicle's side panels, thus in most cases effectively eliminating the vehicle's capability of supporting toppers and frequently adding to the overall width of the vehicle.

In U.S. Pat. No. 5,988,722 (1999) to Parri, a sliding toolbox or drawer system is proposed. The primary innovation or Parri is that the mounting rails may be raised or lowered in fixed increments, whilst remaining within the confines of the vehicle bed. This system suffers from the aforementioned limitations of the other full length bed sliding systems, and requires significant effort to reconfigure the adjustable mounting rails.

Several other methods for moveable truck mounted toolboxes. For example, in U.S. Pat. No. 5,398,987 (1995) Sturgis, an external box is affixed to a side panel inside the bed and the internal enclosure rotates out towards the rear of the bed. The disadvantages of this method are limited size, the permanently mounted stationary enclosure, and the difficult access reaching over the tailgate. In U.S. Pat. No. 6,015,177 (2000) to Tijerina, a toolbox is mounted on rails attached to the inner walls of the side panels that angle up and over the wheel arches. The disadvantages of this method are difficulty in accessing the enclosure, difficulty lifting the enclosure over the wheel arches, and the non-automatic closure of the enclosure in its normal travel position. In U.S. Pat. No. 6,203,087 (2001) and U.S. Pat. No. 6,422,629 (2002) both to Lance et al, rear or front floor-mounted enclosures that are removable are proposed. The disadvantages of these proposals are the limited size of the enclosure, limited utility of the enclosure, and in the front mounted case, the difficulty of access. In U.S. Pat. No. 6,253,976 (2001) to Coleman et al, a side panel mounted sliding and rotating enclosure is proposed. The disadvantages of this proposal are the difficulty is accessing the enclosure and intrusion of the rail system on other bed uses. In U.S. Pat. No. 6,354,647 (2002) to Voves, and U.S. Pat. No. 6,464,274 (2002) to Mink et al, sliding systems mounted to the floor of the bed are proposed. The disadvantages of these systems are they prevent using the bed for any other purposes, and the enclosure is not readily portable.

Several methods have been proposed for lifting storage containers. For example, in U.S. Pat. No. 5,890,866 (1999) to Scheibel, a self-loading transporter is proposed. The primary objective of this device is moving, loading, and lifting a container into a vehicle. The disadvantages of this proposal are that it does not provide an anchored and ready access toolbox when in the vehicle, it does not provide workbench capabilities, and it prevents other uses of the bed when loaded. In U.S. Pat. No. 4,936,624 (1990) to West, and U.S. Pat. No. 5,303,969 (1994) to Simnacher, permanently fixed systems are proposed for hydraulically lifting a toolbox within the confines of a vehicle. However, West provides a hydraulically lifted sections of the storage container, which dramatically reduces the storage space available within the confines of the container. And while Simnacher provides access into the storage container at a better height, the majority of the interior portion of the container still is inaccessible.

All of the vehicle mounted toolbox systems are heretofore known suffer from some combination of the following disadvantages which include not allow for the use of the main bed for other normal purposes, inconvenient access to the contents of the toolboxes by virtue of mounting position, height, or reach and locking mechanism and subsequently the contents of the toolbox are not protected from tampering.

SUMMARY OF THE INVENTION

In order to overcome the above-stated problems and limitations, and others, and to achieve the noted objects, there is provided a storage system for a vehicle.

The present invention provides a storage system for a vehicle, namely a truck, that adjusts the height of the storage compartment to provide an access through the sidewalls of the storage compartment to the interior of the compartment.

The storage system rests within the bed of a truck with the end side walls along the sides of the bed. Upon activation of a lift, the storage container for the storage system is lifted upwards to allow access to the sidewalls of the storage container. Access is the provided to the end sidewalls and the sidewall doors. The interior of the storage container can then be accessed through the sidewall doors.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
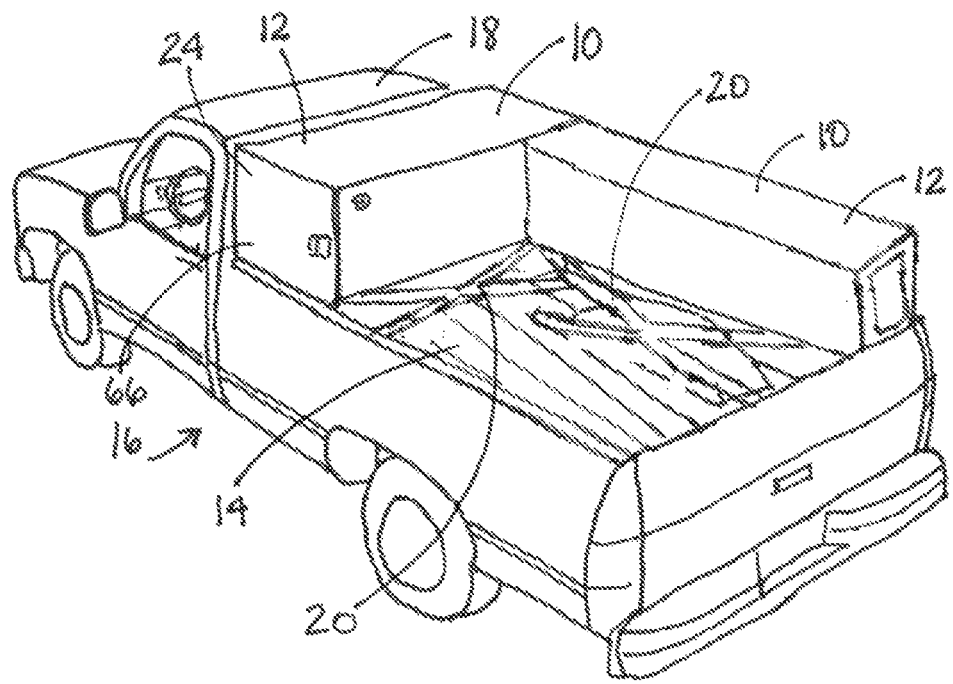
FIG. 1 is a front perspective view of the storage system within the bed of a vehicle and showing the storage system in its raised position.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

The term "and/or" includes any and all combinations of one or more of the associated listed items. The terminology used herein is for the purpose of describing particular embodiments only and is not intended to be limiting. As used herein, the singular forms "a," "an" and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

The term "actuator" is intended broadly to encompass any manual or motorized device for imparting movement along the desired axis. Actuators suitable for use with this invention include motorized actuators including rotary motors, solenoids, hydraulic cylinders, and the like.

As used herein, the term "truck" is intended to include any vehicle having an area, enclosed or open, adapted for storage or transport of cargo of any kind. Thus, the term "truck" includes pickup trucks, such as the one depicted in the figures, as well as vans, flatbed trucks and various other private and commercial vehicles.

As used herein, the term "truck bed" is intended to include the open storage area for a truck or trailer.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

Looking at the drawings in detail, numeral 10 generally designates one embodiment of the present invention. In general, the present invention includes a storage container 12, an interior compartment system 50 and a lift system 20.

As shown in FIG. 1, when used in a pickup truck, the assembly 10 preferably is mountable in the forward end of the cargo area 14, that is, adjacent the rear of the passenger compartment or cab 18 of the truck 16 parallel to the cab 18. However, the placement of the assembly 10 may be varied and may include placement along the sides of the bed, perpendicular to the cab.

The storage container 12 comprises a parallelepiped container equipped with a locking cover 22 hinged to the container body by means of a hinge as shown in FIGS. 2-7 or with a joined top connected to the container body with access to the interior of the storage container from the sides of the container body. The container 12 has two short side walls 24, 26, two long side walls 28, 30 running parallel to the longitudinal axis of the container 12, and a base 32. The base 32 is proximate the bed of the truck and is secured to the lift system 20.

Figure 2:
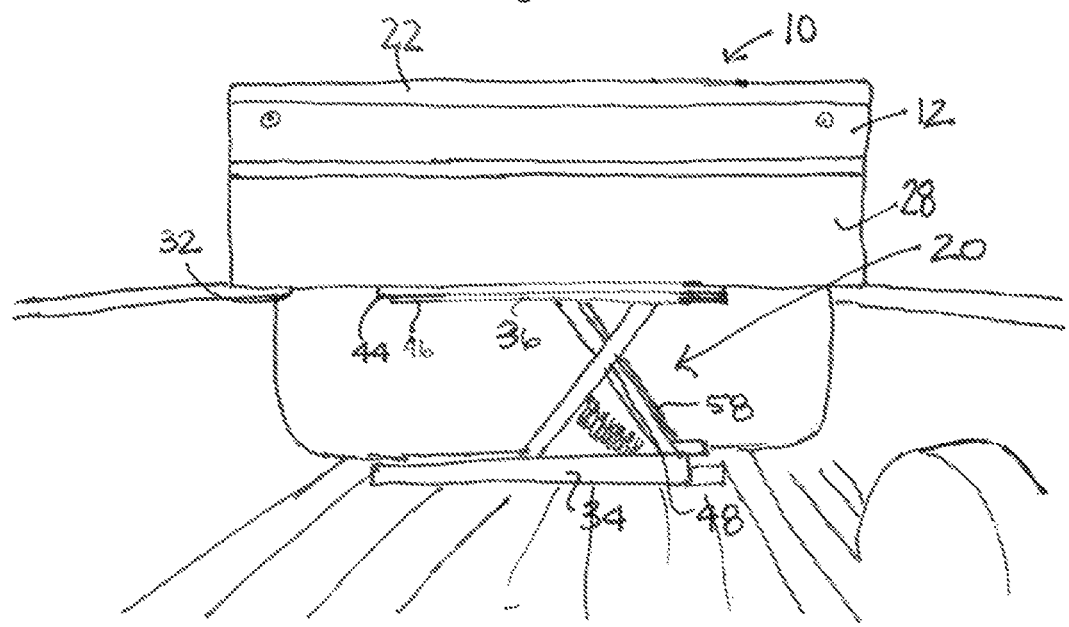
FIG. 2 is a front elevational view of the storage system within the bed of a vehicle and showing the storage system in its raised position.
Figure 3:
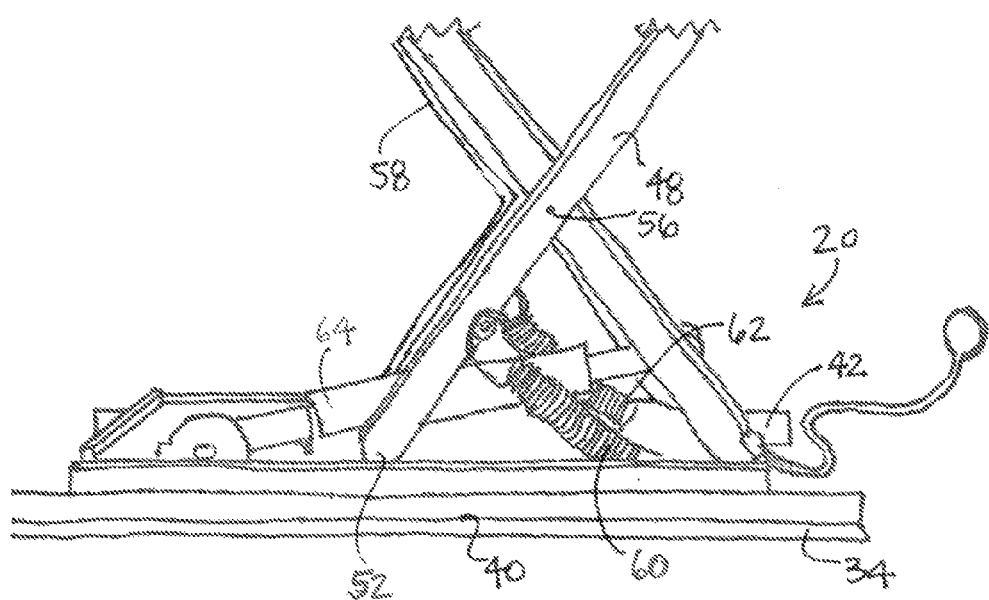
FIG. 3 is a front perspective view of the lift system and rails for the storage system.
Figure 4:
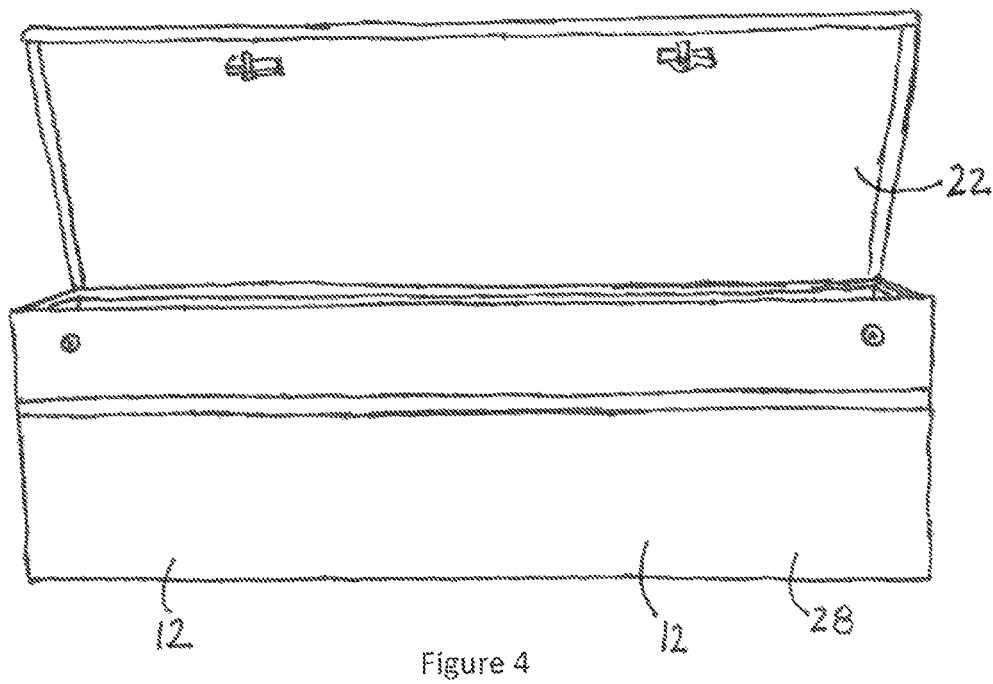
FIG. 4 is a front elevational view of the storage container.

As shown in FIGS. 2-3, the lift system 20 is configured to move the storage container 12 from a first stored position with the storage container base proximate the truck bed base upwards from the bed of the truck to an elevated position above the upper edge of the side walls of the truck or another elevated position such that the side walls 24, 26 of the container 12 are accessible. As shown, the lift system 20 includes a frame 34 secured to the bed of the truck at one end 36 and secured to the base 32 of the container 12 at the other end 38. In general, the frame 34 includes an opposing pair of rails 40, 42 secured to the truck bed at the first end 36 and an opposing pair of rails 44, 46 secured to the base 32 of the container 32. Both the bed pair of rails 40, 42 and the container pair of rails 44, 46 extend along the length of the longitudinal axis of the container and each pair is parallel to the other pair to form a rectangular frame structure. A pair of scissor arms 48, 58 are connected at one end 52 to the bed rails 40, 42 and at the opposing end 54 to the container rails 44, 46.

Referring to FIG. 3, the detail of the scissor arms and rail arrangement are shown in greater detail. The first scissor arm 48 has one end 52 pivotally secured within the bed rail 40 such that the first scissor arm 48 end 52 is configured to move along the bed rail 40. Alternatively, the first scissor arm 48 may be pivotally secured at the container end 54 of the arm 48 to move along the container rail 44. The second scissor arm 58 has one end 52 pivotally secured within the bed rail 42 such that the second scissor arm 58 end 52 is configured to move along the bed rail 42. Alternatively, the second scissor arm 58 may be pivotally secured at the container end 54 of the arm 58 to move along the container rail 46. The scissor arms 48, 58 are pivotally connected through a pivot pin 56.

The scissor arms 48, 58 preferably comprise extruded aluminum, steel, or stainless steel and may be extendable. The scissor arms 48, 58 are preferably hydraulic, gas charged, spring loaded as shown. The set of compression springs 60, 62 each connected to a scissor arm are used to support and automatically raise and lower the container 12. Each compression spring 60, 62 is held in place by a single threaded rod or similar fastener at one end to a scissor arm 48, 58 and at the opposing spring end to corresponding bed rail 40, 42.

An actuator such as a hydraulic cylinder 64 or linear actuator is shown in FIG. 3 to provide assist the raising and lowering of the container 12 and the movement of the scissor arms 48, 58. The actuatory and lift system 20 can be operated through activation within the cab of the vehicle. Other mechanisms may be used to move the container 12, including but not limited to a 12 volt electric motor, a 12-volt screw linear actuator, or other similar power sources.

The container 12 includes access doors 66, 68 on the side walls 24, 26 of the container 12. These access doors 66, 68 are hingeably connected to the container body 12 and are accessible when the container 12 is in a raised position. The lift system 20 is configured to move the container 12 from a first lowered position with the access doors 66, 68 proximate to the walls of the bed of the truck to a second raised position with the access doors 66, 68 raised above the walls of the bed of the truck. In this manner, the doors 66, 68 can be opened.

Figure 5:
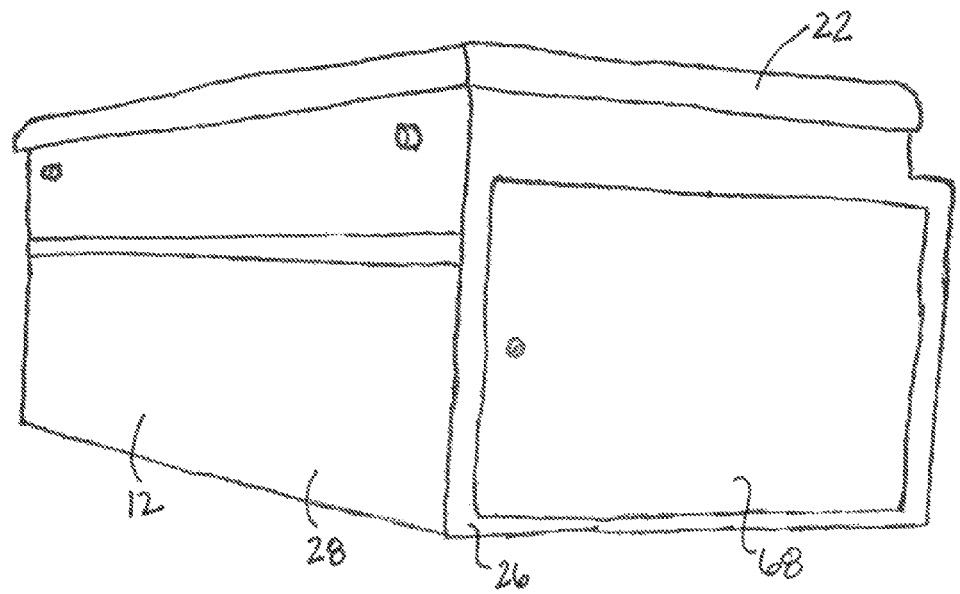
FIG. 5 is a front perspective view of the storage container.
Figure 6:
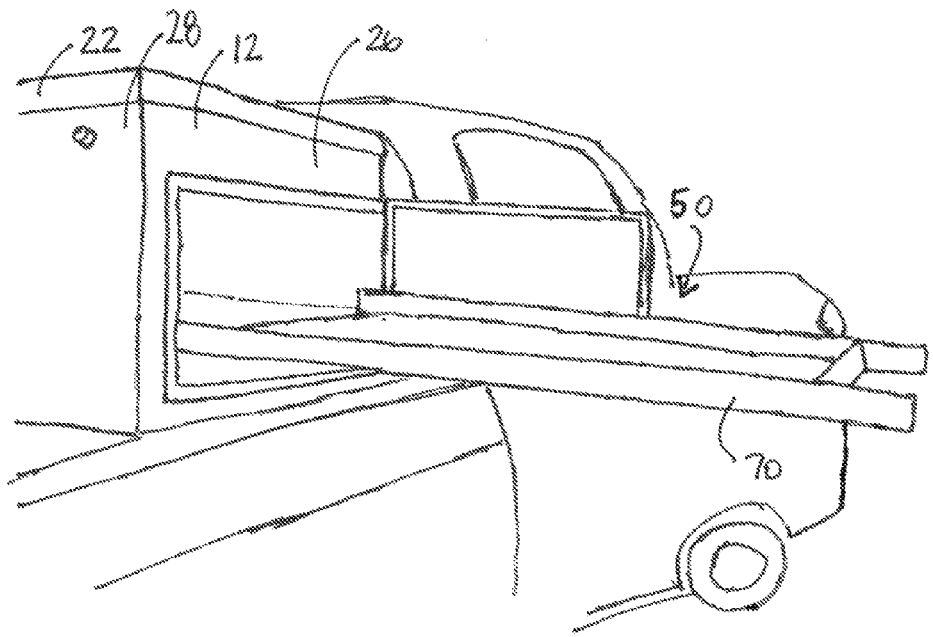
FIG. 6 is a front perspective view of the storage system with the storage system in its raised position and the interior drawer extended.
Figure 7:
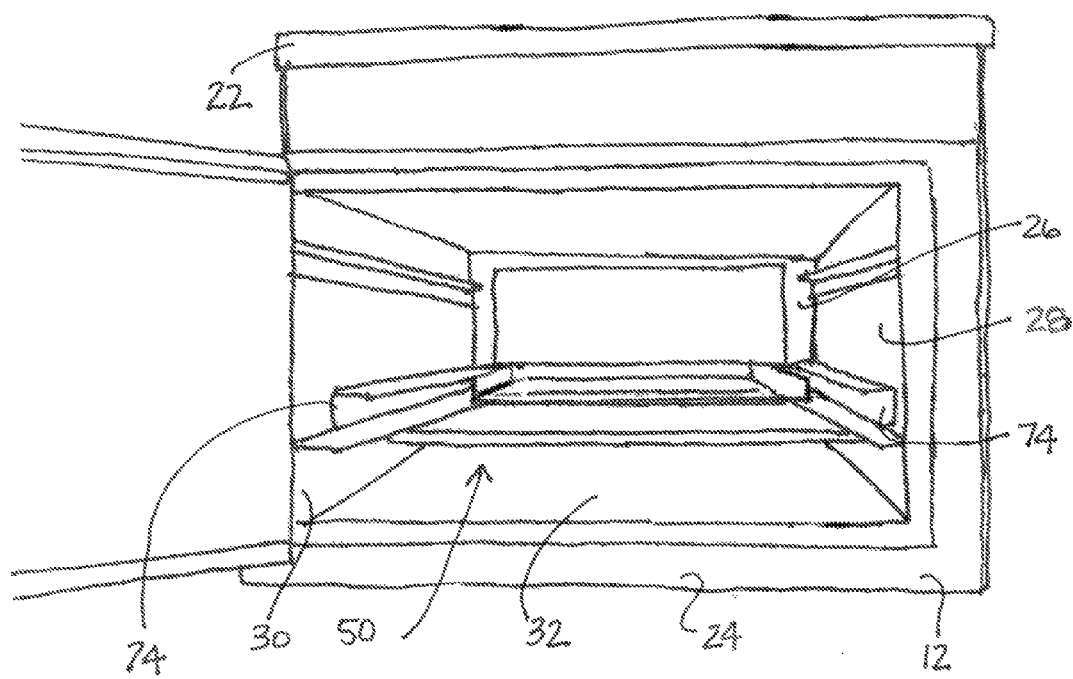
FIG. 7 is a side view of the interior compartment of the storage system within the bed of a vehicle and showing the storage system in its raised position.

As shown in FIG. 5-7, the interior compartment system 50 includes a slidable drawer 70 and drawer rail system 72 within the interior of the container 12. The drawer 70 includes roller attachments or similar attachments that engage the rail system 72 to allow the drawer 70 to be motivated along the rail system 72. The rail system 72 runs parallel to the longitudinal axis of the container 12. Once the container 12 is in its raised position above the walls of the bed of the truck, the drawer 70 can move along a track 74 within the container 12 the longitudinal axis of the container 12 from a first position within the container 12 to a second position with the majority or a substantial portion of the drawer 70 outside of the container as shown in FIG. 6. In this manner, the contents of the container can easily be accessed. The drawer track 74 has an opposing track on the opposite side of the container for maintaining the stability of the drawer 70.

A bed topper can likewise utilize the lift system employed here to provide a lid 76 that covers the bed of a truck.

It will be understood that certain features and subcombinations are of utility and may be employed without reference to other features and subcombinations and are contemplated within the scope of the claims. Not all steps listed in the various figures need be carried out in the specific order described.

What is claimed is:

1. A truck bed storage system for use with a truck having a bed with a base and bed side panels each having an upper edge, the truck bed storage system comprising:
   a storage container having an interior enclosed by a top panel connected to the container and configured to provide access to said interior of said storage container, two short side panels, two long side walls, and a base;
   a lift system secured to said base of said storage container and configured to move said storage container from a stored position with said base of said storage container proximate the base of the truck bed and said storage container side panels in proximity to said bed side panels to an elevated position with said base spaced distally from said base of the truck bed and said storage container side panels spaced above said upper edge of said bed side panels, said lift system comprising:
      at least one base rail secured to the base of the truck bed;
      at least one top rail secured to the base of said storage container;
      at least one scissor arm mechanism having two scissor arms pivotally connected;
      an actuator;
   at least one access door hingeably connected to one of said two short side panels, whereby movement of said storage container to said elevated position provides a user access to said at least one access door; and
   said storage container having a slidable drawer extending along the length of the longitudinal axis of the storage container and configured to extend from a stored position with said storage container through said at least one access door to an extended position outward from said storage container along the longitudinal axis of said storage container when said lift system is in said elevated position.

2. A truck bed storage system for use with a truck having a bed with a base and bed side panels each having an upper edge, the truck bed storage system comprising:
   a storage container having an interior compartment enclosed by a top panel connected to the container and configured to provide access to said interior compartment of said storage container, side panels, and a base to define an interior compartment;

a lift system secured to said base of said storage container and configured to move said storage container from a stored position with said base of said storage container proximate the base of the truck bed and said storage container side panels in proximity to said bed side panels to an elevated position with said base spaced distally from said base of the truck bed and said storage container side panels spaced above said upper edge of said bed side panels, said lift system comprising a scissor arm mechanism having two scissor arms pivotally connected and an actuator;

at least one access door hingeably connected to a side panel, whereby movement of said storage container to said elevated position provides a user access to said at least one access door; and a slidable drawer within said storage container extending along the length of the longitudinal axis of the storage container and configured to extend from a stored position with said storage container to an extended position through said at least one access door outward from said storage container along the longitudinal axis of said storage container when said lift system is in said elevated position.

3. A truck bed storage system for use with a truck having a bed with a base and bed side panels each having an upper edge, the truck bed storage system comprising:

a storage container having side panels and a base, said side panels having at least one access door;

a lift system secured to said base of said storage container and configured to move said storage container from a stored position with said base of said storage container proximate the base of the truck bed and said storage container side panels in proximity to said bed side panels to an elevated position with said base spaced distally from said base of the truck bed and said storage container side panels spaced above said upper edge of said bed side panels, said lift system comprising an actuator;

said pair of side panels having at least one access door, whereby movement of said storage container to said elevated position provides a user access to said at least one access door, and a slidable drawer extending along the length of the longitudinal axis of the storage container and configured to extend from a stored position with said storage container to an extended position through said at least one access door outward from said storage container along the longitudinal axis of said storage container when said lift system is in said elevated position.

4. The storage bed system of claim 3, said lift system further comprising:

at least one base rail secured to the base of the truck bed;

at least one top rail secured to the base of said storage container; and at least one scissor arm mechanism having two scissor arms pivotally connected.

* * * * *